United States Patent [19]
Takita

[11] Patent Number: 5,564,223
[45] Date of Patent: Oct. 15, 1996

[54] QUICK-PEELABLE FRUIT PROTECTIVE WRAP

[75] Inventor: Kazuhiko Takita, Ohita, Japan

[73] Assignee: Nippon Film Co., Ltd., Ohita, Japan

[21] Appl. No.: 323,397

[22] Filed: Oct. 14, 1994

[30] Foreign Application Priority Data

Oct. 15, 1993 [JP] Japan ................. 5-060662 U

[51] Int. Cl.$^6$ ................................. A01G 13/00
[52] U.S. Cl. ................... 47/26; 383/8; 383/37; 383/207; 383/66; 383/120
[58] Field of Search ............... 47/26 IF, 1.01; 383/8, 37, 207, 66, 120

[56] References Cited

U.S. PATENT DOCUMENTS

| | | | |
|---|---|---|---|
| 2,306,335 | 12/1942 | Feigenbutz | 383/207 |
| 3,352,411 | 11/1965 | Schwarzkopf | 383/8 |
| 3,749,237 | 7/1973 | Dorton | 383/37 |
| 4,554,761 | 11/1985 | Tell | 47/26 IF |
| 4,618,992 | 10/1986 | Grotteria | 383/207 |
| 4,786,275 | 11/1988 | Hoover | 383/38 |
| 5,406,742 | 4/1995 | Hoshino | 47/26 IF |
| 5,429,646 | 7/1995 | Givens | 47/26 IF |

FOREIGN PATENT DOCUMENTS

| | | | |
|---|---|---|---|
| 2807162 | 8/1978 | Germany | 383/8 |
| 5304842 | 11/1993 | Japan | 47/26 IF |
| 44527 | 12/1938 | Netherlands | 47/26 IF |

*Primary Examiner*—Henry E. Raduazo
*Attorney, Agent, or Firm*—Flynn, Thiel, Boutell & Tanis, P.C.

[57] ABSTRACT

A quick-peelable fruit protective wrap comprises gadgets formed by folding both lateral sides of the wrap outside in, a nearly U-shaped notch portion forming a pair of strips with both sides of the opening portion in the top connected together to span over a branch, and a base portion with the gadgets also adhered in one body, and has pores on the whole surface, the pores are formed in ovals with the long diameters directed along the opening and base portions and the base portion of the wrap is of reinforced structure, thereby permitting a fruit to be taken out at a stretch from the wrap and simultaneously the wrap to be removed from the branch bearing the fruit.

17 Claims, 3 Drawing Sheets

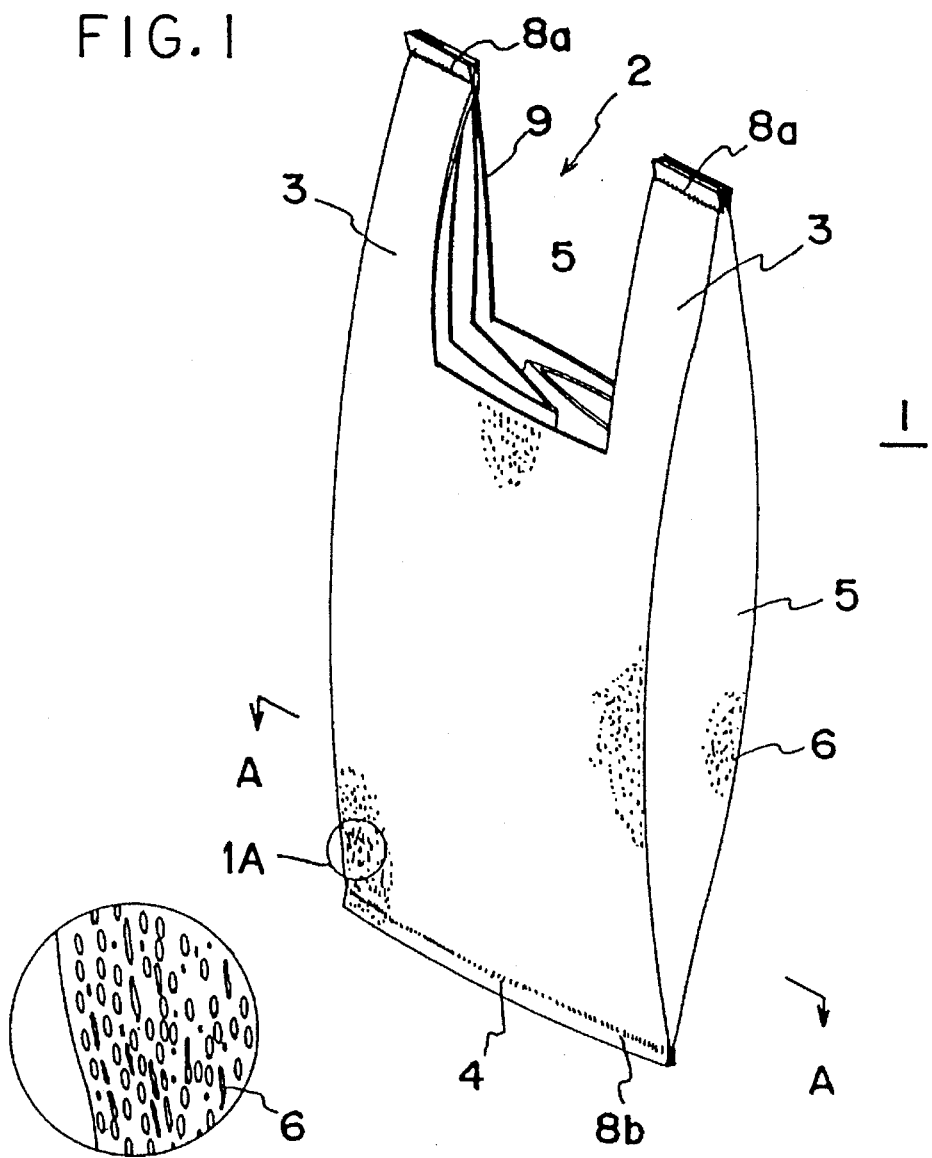
FIG.1
FIG.1A
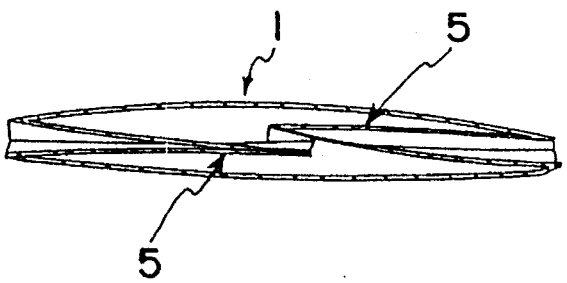
FIG.2

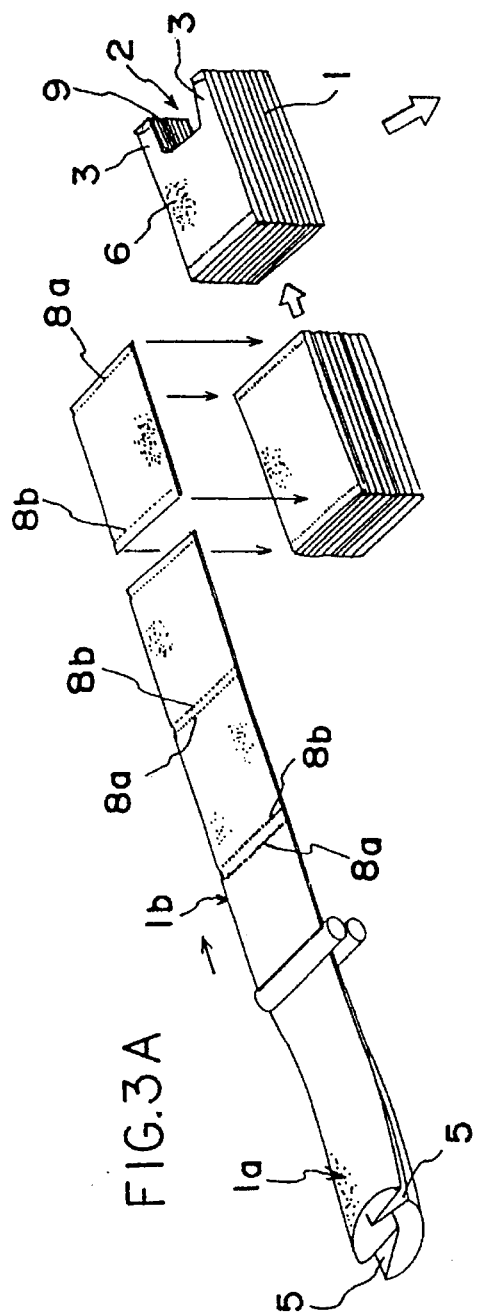
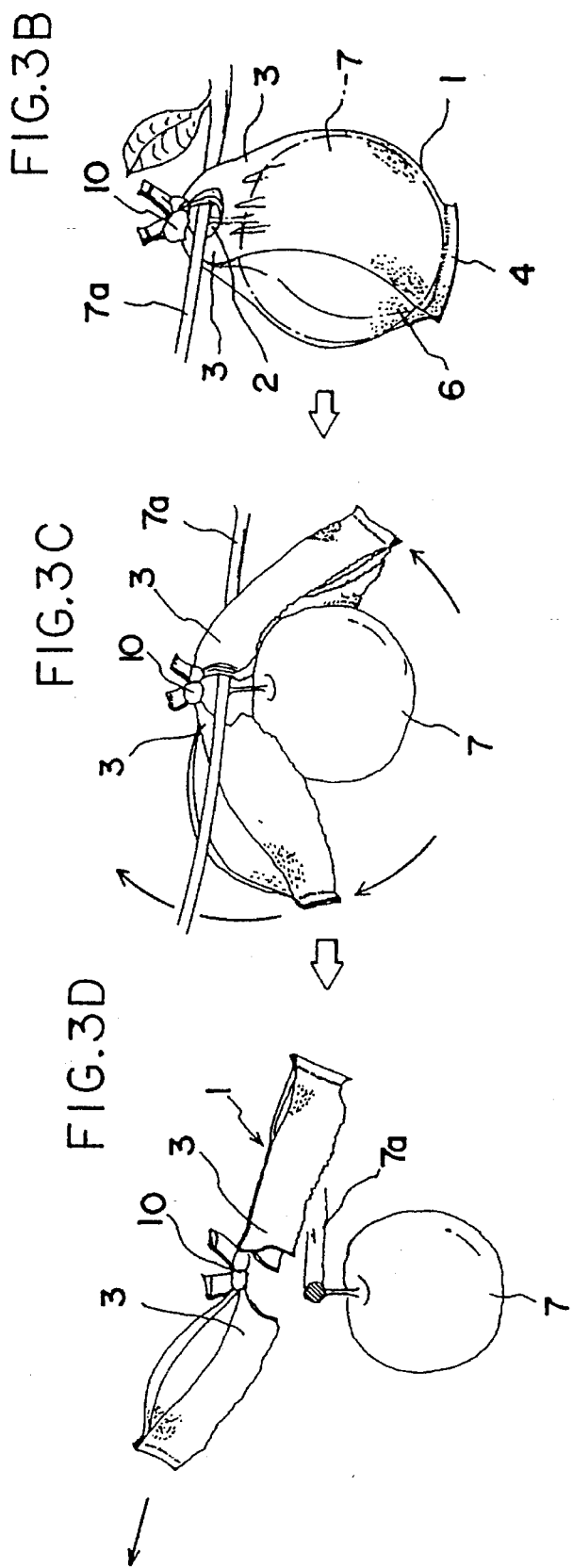

QUICK-PEELABLE FRUIT PROTECTIVE WRAP

BACKGROUND OF THE INVENTION

1. Field of the Invention

The invention refers to a quick-peelable fruit protective wrap that is gas permeable and insect proof, can be made strong enough to prevent fruits from dropping due to breakage of the base portion even during a storm, and can easily perform the taking-out of fruits and removal of wraps, thus implementing the saving of labor.

2. Description of the Prior Art

So far been employed as fruit protective wraps have those made of paper or resin with the bottom folded sheet-like and adhered to make the base portion for being tied to a branch using wires with the opening portion closed or for being hung over a branch with both sides of the opening portion held up after a fruit is inserted.

However, these conventional fruit protective wraps present problems in that, during the harvest of fruits, fruits must be taken out by removing wraps after rewinding wound wires one by one, or by untying knots, or by cutting wraps open with scissors and accordingly a great deal of labor is required and sometimes little goes well for short-time and concentrated handling.

In addition, since the base portion of conventional fruit protective wraps are adhered simply with both surfaces folded, there is another problem that spherical-shaped fruit tend to be settled in the envelop-like base portion when the wrap is tied in such a way to somewhat pull up the fruit or when the fruit falls in the wrap as a result of being swung around by a strong wind. Thus both sides of the joint in the base portion receives no weight of the fruit but the central part does as the whole weight concentrates in one point until at last the wrap begins to break from the joint in the base portion and allows the fruit to drop.

SUMMARY OF THE INVENTION

The invention provides a quick-peelable fruit protective wrap that, at the harvest of fruits, can easily and in a short time collect fruits and remove wraps by peeling the wrap off a fruit at a stretch and simultaneously removing the wrap from a branch by a simple hand action and also can prevent the base portion against breakage even if the weight of a fruit acts on the joint in the base portion.

For this purpose, a quick-peelable fruit protective wrap according to the invention includes folds formed by folding both sides of the wrap outside in, a nearly U-shaped notch portion forming a pair of strips with both lateral sides of the opening portion on the top connected together to span over a branch, and a base portion with the folds adhered in one body and is formed of a foam plastic sheet with many pores generated overall by air bubbles, said pores being formed in ovals with the long diameters along the top opening and base portions.

A quick-peelable fruit protective wrap according to another embodiment of this invention includes at least one strip of successive perforations provided from the base side of the nearly U-shaped notch on the top opening to the base portion at much the same position on both sides.

A quick-peelable fruit protective wrap according to another embodiment of the invention includes a base portion with the overlapped portions arising from formation of said folds also adhered in one body.

In a quick-peelable fruit protective wrap according to this invention described, since a nearly U-shaped notch portion is provided on the opening side with both ends left as strip portions, a short-time covering with the wrap is possible by setting the strip portions upward from both sides of the branch bearing fruit to above the branch and mutually connecting the strip portions over the branch after inserting the fruit in the wrap from the opening with the gadgets kept open Further, when the weight of a fruit acts on the base portion of a wrap, the base portion comes to touch concentratedly upon the lower nearly global portion of a fruit because the base portion along with the folds are in contact with the body of the fruit. Thus, since the whole base portion can receive the weight of the fruit, the strength of a wrap is sufficient for supporting the weight of a fruit.

In the meantime, the wrap is provided overall with oval pores having their long diameters along the direction of the top opening to base portion, a fruit in the wrap can be exposed by peeling off the wrap at a stretch and the wrap can be removed from on the branch at a stretch without untying the knot by pulling against each other from side to side with the center portion of the base portion in the hands and tearing the wrap from the base portion to the base side of the nearly U-shaped notch portion along a string of pores.

Because of being formed of foam plastic sheets, this fruit wrap is good for cushioning and can protect a fruit against external forces, thereby preventing it from being damaged. Adhering the folds in one body is utilized for making a wrap open at the harvest that a foam plastic sheet is easy to tear with the hands and for improving the strength of the joint in the base portion.

In a quick-peelable fruit protective wrap according to this invention, a fruit in the wrap can be taken out at a stretch by tearing the sewing-machine seams because the wrap opens from the opening portion to the base portion. Further, since the base portion comes to be splitted into halves, this wrap can be removed from over the branch at a stretch without untying the knot.

A quick-peelable fruit protective wrap according to this invention is so constructed that the overlap portions arising from formation of said folds are provided also with the base portion adhered in one body. Consequently, when the weight of a fruit acts on the base portion of the wrap, the base portion comes to touch concentratedly upon the lower nearly global portion of a fruit because the base portion along with the overlap portions arising from formation of gadgets are adhered in one body. Thus, since the overall base portion can receive the weight of the fruit, the strength of a wrap remains sufficient for supporting the weight of a fruit.

BRIEF DESCRIPTION OF THE DRAWINGS

FIG. 1 is a perspective view illustrating a quick-peelable fruit protective wrap according to the first embodiment of the invention.

FIG. 1A is an exploded view of a portion of the wrap depicted in FIG. 1.

FIG. 2 is a sectional view along section line A—A of FIG. 1.

FIG. 3A is an explanatory drawing outlining the fabrication of the protective wrap.

FIG. 3B illustrates a protective wrap in place about an article of fruit.

FIGS. 3C and 3D illustrate removal of the protective rap prior to harvesting.

DETAILED DESCRIPTION OF THE INVENTION

Figure 4:
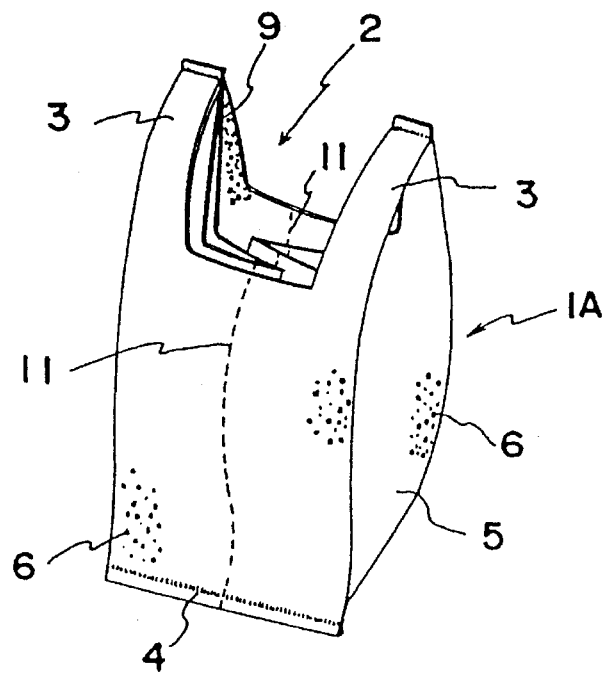
FIG. 4 is a perspective view Illustrating a quick-peelable fruit protective wrap according to the second embodiment of the invention.

Referring to the drawings, the embodiments of a quick-peelable fruit protective wrap according to the present invention will be described in detail. First, the constitution of a quick-peelable fruit protective wrap of the first embodiment will be described.

As shown in FIGS. 1, 1A and 2, a quick-peelable fruit protective wrap 1 of the first embodiment has an opening portion 2 and a strip portion 3 on the top, a base 4 on the bottom, and folds 5 on the both sides, and is provided with many pores 6 on the whole surface.

Now, a fabrication method will be described referring to FIG. 3.

First, employ a cylindrical foam polyethylene material 1a whose diameter larger than that of a fruit to be protected 7 and provide folds 5 on both sides with the tip ends overlapped on each other to form a narrow cylindrical sheet 1b. Then, provide two strips of welded portions 8a, 8b in pairs at given intervals so as to have them disposed across the sheet by means of two close strips of welding means. Thereafter, cut the middle line between the welding portions 8a, 8b and stack them one on another successively, then make a notch on the side of the welded portion 8a from the top in a nearly U shape. Thus, an opening proportion 2 and strip portions 3, 3 are formed from the U-shaped notch portion and from the rest portions on both sides, while the base portion 4 of the fold-provided wrap is formed from the welded portion 8b in the bottom (FIG. 3A).

In this case, the aforesaid cylindrical foam polyethylene 1a is molded by inflation process with a foaming agent added to polyethylene resin as raw material and made foamy by heating during inflation process to form a oval pores, long in the drawing direction, on the whole surface. Thus, in a quick-peelable fruit protective wrap formed by the process, these pores turn out to appear as pores 6 with the long diameters directed from the opening portion 2 to the base portion 4.

Now, a method of using this quick-peelable fruit protective wrap 1 will be described.

First, open the opening portion 2 and put a fruit 7 in the wrap 1. In this time, the folds 5 open, permitting the fruit 7 to be received loosely.

Under these circumstances, connect strip portions 3, 3 firmly together so a to span over a branch 7a bearing the fruit 7 (FIG. 3B). When falling as a result of being swung around by a strong wind or other causes, the fruit 7 is caught by the base portion 4. In this case, the base portion 4 comes to hold the fruit 7 chiefly at its lower nearly global portion because of being shorter than the diameter of the fruit 7.

Thus, the lower portion of a quick-peelable fruit protective wrap 1 comes around below the fruit 7 and accordingly the weight of the fruit 7 comes to be held about equally by its lower portion as a whole.

At the harvest, the quick-peelable fruit protective wrap can be torn along the string of pores 6 to the opening portion 2 on pulling the middle of the base portion 4 with the hands from side to side, thereby permitting the fruit to be exposed by peeling at a stretch for harvest (FIG. 3C). Since the knot 10 is provided over a branch 7a, the wrap can be torn and simultaneously removed without untying the knot (FIG. 3D).

In addition, this quick-peelable fruit protective wrap 1 is excellent in gas permeability and draining because of being provided with pores, and also abundant in cushioning and accordingly can protect a fruit sufficiently. In the meantime, since a foam resin sheet has innumerable pores and is quite excellent in gas permeability and draining, this wrap may cover a fruit from over a paper wrap even if the fruit is already covered with the paper wrap.

Now, the second embodiment will be described referring to FIG. 4. In this embodiment, like numerals are assigned to the same components as with the first embodiment and the explanation for them is omitted.

A quick-peelable fruit protective wrap 1 according to this embodiment is featured by using a resin film, providing innumerable pores 6 on its whole surface with a machine, and providing perforations 11 on both sides (both surfaces).

The embodiments of the invent has been described in the above, but a concrete construction of the invent is not restricted to these embodiments and design and other changes that do not depart from the spirit and scope of the invention are intended to be embraced by the invent.

Figure 5:
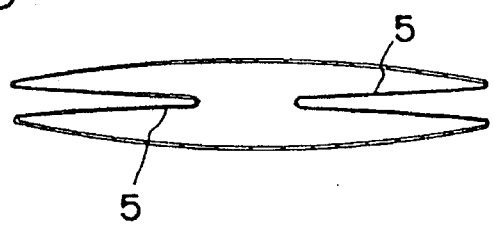
FIG. 5 is a perspective view illustrating a quick-peelable fruit protective wrap according to a third embodiment of the invention.

For example, in the embodiments, the folds 5 are designed to be provided so as that the tip parts may overlap, but they are not limited to this and may not overlap as shown in FIG. 5. Further, the width of a cylindrical sheet after providing the gadgets is also optional.

As sheet materials, not only polyethylene resin but also polypropylene resin, soft vinyl chloride resin, and other thermoplastic resins can be used.

In addition, paper having pores bored with a machine, paper coated with resin, or like paper can be used.

Figure 6:
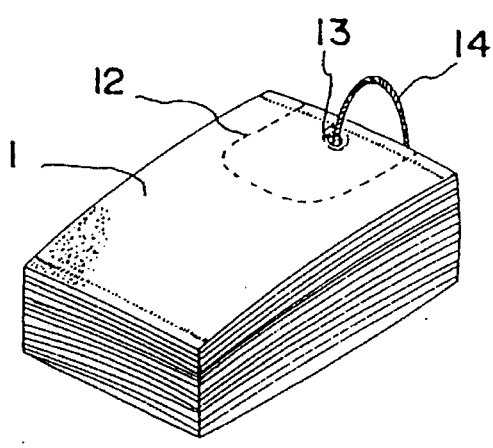
FIG. 6 is a perspective view illustrating a quick-peelable fruit protective wrap according to a fourth embodiment of the invention.

As shown in FIG. 6, a quick-peelable fruit protective wrap may be designed so that nearly U-shaped sewing-machine seams 12 are provided from the end of the opening portion with many sheets overlapped, a cord 14 is inserted in through holes 13 formed by piercing a hot pin into this portion, a stack of wraps are hung on the waist or another point of body, and wraps are drawn out ode by one in covering fruits to form a nearly U-shaped notch with perforations and provide strip portion on both side of it.

Or, all pores may be formed as perforations.

As described above, since a quick-peelable fruit protective wrap as set forth in claim 1 of this invention is constructed as set forth above, both side parts of the nearly U-shaped notch portion can easily be connected together over a branch after covering a fruit, thereby permitting the labor in covering to be saved. Further, since the base portion comes to touch concentratedly upon the bottom of a fruit, the weight of the fruit acts equally on the whole base portion and only a small force acts on a point, thereby permitting the fruit protected without breakage of the base portion due to weight of the fruit as well as without fall of the fruit.

In addition, since a fruit in the wrap can be exposed at a stretch by tearing the wrap along a string of pores from the base portion to the base side of the U-shaped notch and also the wrap can be removed from over a branch at a stretch without untying the knot, effects are obtained such as saving of labor in operations from covering fruits to harvest of fruits and removal of wraps. Similar advantages are obtained in versions of the invention wherein the bass are provided with separation perforations.

What is claimed is:

1. A quick-peelable wrap for enveloping and thus protecting fruit on a plant, said wrap comprising;

a wrap bag having a closed end and an open end and longitudinal sides that extend between said closed end and said open end, said wrap bag being formed from a material that defines a plurality of pores that extend through said bag;

a pair of inwardly directed folds formed in said bag, each said fold extending inward from one said side of said bag toward said other side of said bag wherein said folds are formed to at least partially overlap each other;

a notch defined by said bag adjacent said open end thereof, said notch being defined by a pair of spaced apart strips that extend along said sides of said bag, said strips being connectable together to span over a plant branch; and a separation assembly extending through said bag body from said bag closed end to said notch to facilitate separation of said bag into two sections.

2. The wrap of claim 1, wherein said pores are formed in said bag so to have a substantially oval profile and are oriented longitudinally from said bag closed end to said bag notch so as to form said bag separation assembly.

3. The wrap of claim 1, wherein said bag is formed with perforation lines that extend from said bag closed end to said notch, said perforation lines serving as said separation mechanism.

4. The wrap of claim 3, wherein said pores are formed in said bag to have substantially oval profiles.

5. A bundle of protective fruit wraps, said bundle comprising:

a plurality of stacked bags, each said bag being formed out of porous material and being shaped to define two opposed faces, a sealed closed end, a sealed open end distal from said closed end, laterally spaced longitudinally extending sides, and a pair of inwardly directed folds, each said fold extending along one side of said bag and being directed toward the other said side of said bag so that said folds at least partially overlap each other;

a removable panel attached to each said face of said bag, each said panel, when removed defining two spaced apart tie strips located adjacent said bag sides, said strips defining a notch therebetween;

first separation assemblies integral with each said bag face, each said first separation assembly extending from said bag closed end to said notch to facilitate separation of said bag into two sections; and a fastening member attached to said plurality of said bag removable panels for securing said panels together so that as long as said bag remains attached to said removal panels with which said bag is associated, said bag remains attached to other said bags so attached.

6. The protective fruit wraps of claim 5, wherein said pores are formed in each said bag so to have substantially oval profile and are oriented longitudinally from said bag closed end to said bag notch so as to form said first separation assemblies.

7. The protective fruit wraps of claim 5, wherein said each bag is formed with perforation lines that extend from said bag closed end to said notch, said perforation lines serving as said first separation assemblies.

8. The protective fruit wraps of claim 5, wherein said fastening member comprises a cord that extends through said bag removable panels.

9. The protective fruit wraps of claim 5, wherein each said bag face is formed with a generally U-shaped strip of perforations adjacent said removable panels, said perforation strips functioning as second separation assemblies.

10. The protective fruit wraps of claim 9, wherein said pores are formed in each said bag so to have substantially oval profile and are oriented longitudinally from said bag closed end to said bag notch so as to form said first separation assemblies.

11. The protective fruit wraps of claim 9, wherein said each bag is formed with perforation lines that extend from said bag closed to said notch, said perforation lines serving as said first separation assemblies.

12. The protective fruit wraps of claim 9, wherein said fastening member comprises a cord that extends through said bag removable panels.

13. A bundle of protective fruit wraps, said bundle comprising of:

a plurality of stacked bags, each said bag being formed out of porous material and being shaped to have:
   two opposed faces;
   a sealed closed end;
   a sealed open end distal from said closed end;
   laterally spaced longitudinal extending sides;
   opposed inwardly directed folds, each said fold extending along one side of said bag and being directed to said other side of said bag, said folds being further shaped so as to at least partially overlap each other between said bag faces;
   two removable panels, each said removable panel being integrally formed with a separate one of said bag faces wherein each bag face is formed with a panel separation assembly to facilitate removal of said panel from said face, said panel when removed, defining two spaced apart tie strips located adjacent said bag sides and a notch located between said tie strips; and
   two bag separation assemblies, each said bag separation assembly being integral with a separate one of said bag faces, each separation assembly extending from said bag closed end to said notch to facilitate separation of said bag into two sections; and a fastening member attached to said plurality of said bag removal panels so that as long as said bag remains attached to said removable panels with which said bag is associated, said bag remains attached to other said bags so attached.

14. The protective fruit wraps of claim 13, wherein each said bag face is formed with a generally U-shaped strip of perforations adjacent said removable panels, said perforation strips functioning as said panel separation assemblies.

15. The protective fruit wraps of claim 13, wherein said pores are formed in each said bag so to have substantially oval profile and are oriented longitudinally from said bag closed end to said bag notch so as to form said bag separation assemblies.

16. The protective fruit wraps of claim 13, wherein said each bag is formed with perforation lines that extend from said bag closed to said notch, said perforation lines serving as said bag separation assemblies.

17. The protective fruit wraps of claim 13, wherein said fastening member comprises a cord that extends through said bag removable panels.

* * * * *

UNITED STATES PATENT AND TRADEMARK OFFICE
CERTIFICATE OF CORRECTION

PATENT NO. : 5 564 223
DATED : October 15, 1996
INVENTOR(S) : Kazuhiko TAKITA

It is certified that error appears in the above-indentified patent and that said Letters Patent is hereby corrected as shown below:

Column 6, line 20; delete "of".

Signed and Sealed this

Twenty-fourth Day of June, 1997

*Attest:*

BRUCE LEHMAN

*Attesting Officer*　　　Commissioner of Patents and Trademarks